(12) United States Patent  
Maruyama (10) Patent No.: US 10,673,048 B2  
(45) Date of Patent: Jun. 2, 2020

(54) SECONDARY BATTERY

(71) Applicant: SANYO Electric Co., Ltd., Daito-shi, Osaka (JP)

(72) Inventor: Masahide Maruyama, Nara (JP)

(73) Assignee: SANYO Electric Co., Ltd., Daito-shi (JP)

( * ) Notice: Subject to any disclaimer, the term of this patent is extended or adjusted under 35 U.S.C. 154(b) by 175 days.

(21) Appl. No.: 16/000,273

(22) Filed: Jun. 5, 2018

(65) Prior Publication Data

US 2019/0173071 A1  Jun. 6, 2019

(30) Foreign Application Priority Data

Jun. 13, 2017 (JP) .................................. 2017-115557

(51) Int. Cl.

| | |
|---|---|
| *H01M 2/18* | (2006.01) |
| *H01M 10/04* | (2006.01) |
| *H01M 10/0585* | (2010.01) |
| *H01M 10/0525* | (2010.01) |
| *H01M 4/1391* | (2010.01) |
| *H01M 4/133* | (2010.01) |
| *H01M 4/1393* | (2010.01) |
| *H01M 4/131* | (2010.01) |

(Continued)

(52) U.S. Cl.

CPC .............. *H01M 2/18* (2013.01); *H01M 4/131* (2013.01); *H01M 4/133* (2013.01); *H01M 4/1391* (2013.01); *H01M 4/1393* (2013.01); *H01M 4/70* (2013.01); *H01M 10/049* (2013.01); *H01M 10/0413* (2013.01); *H01M 10/0525* (2013.01); *H01M 10/0585* (2013.01); *H01M 2004/021* (2013.01); *H01M 2004/027* (2013.01); *H01M 2004/028* (2013.01); *H01M 2220/20* (2013.01)

(58) Field of Classification Search
None
See application file for complete search history.

(56) References Cited

U.S. PATENT DOCUMENTS

2007/0105015 A1 * 5/2007 Munenaga .......... H01M 2/0404  
429/161  
2011/0135981 A1  6/2011 Sato et al.

FOREIGN PATENT DOCUMENTS

JP  10-275628 A  10/1998  
JP  2012-156128 A  8/2012

\* cited by examiner

*Primary Examiner* — Wyatt P McConnell  
(74) *Attorney, Agent, or Firm* — Westerman, Hattori, Daniels & Adrian, LLP (57) ABSTRACT

A secondary battery has an electrode assembly including a negative electrode plate and a positive electrode plate and a battery case accommodating the electrode assembly. The negative electrode plate includes a negative electrode core body and first and second negative electrode active material mix layers disposed on the respective surfaces of the negative electrode core body. A first separator is bonded to the first negative electrode active material mix layer, and a second separator is bonded to the second negative electrode active material mix layer. In at least one side edge portion of the negative electrode plate, the first separator has a first bent portion bent toward the second separator, the negative electrode core body has a second bent portion bent toward the second separator, and the second negative electrode active material mix layer includes a region having a thickness less than the thickness of the central portion.

6 Claims, 9 Drawing Sheets

(51) Int. Cl.
*H01M 4/70* (2006.01)
*H01M 4/02* (2006.01)

Figure 13

SECONDARY BATTERY

CROSS REFERENCE TO RELATED APPLICATIONS

The present invention application claims priority to Japanese Patent Application No. 2017-115557 filed in the Japan Patent Office on Jun. 13, 2017, the entire contents of which are incorporated herein by reference.

BACKGROUND OF THE INVENTION

Field of the Invention

The present invention relates to a secondary battery.

Description of Related Art

Secondary batteries, e.g., a nonaqueous electrolyte secondary battery, have been used for hybrid electric vehicles, electric vehicles, and large storage battery systems.

Such secondary batteries include an electrode assembly in which a positive electrode plate and a negative electrode plate are stacked or rolled with a separator interposed therebetween, where a positive electrode active material mix layer is disposed on a positive electrode core body in the positive electrode plate, and a negative electrode active material mix layer is disposed on a negative electrode core body in the negative electrode plate.

Japanese Published Unexamined Patent Application No. 10-275628 (Patent Document 1) proposes that a separator is bonded and fixed to a negative electrode or a positive electrode for the purpose of facilitating production of an electric power generation element including the negative electrode and the positive electrode so as to enhance productivity.

In Patent Document 1, the shape and the like of a cut portion of a negative electrode plate having both surfaces to which separators are bonded is not sufficiently discussed.

BRIEF SUMMARY OF THE INVENTION

It is an object of the present invention to provide a secondary battery with high reliability.

A secondary battery according to an aspect of the present invention has an electrode assembly including a first electrode plate and a second electrode plate and has a battery case that accommodates the electrode assembly, wherein the first electrode plate includes a first electrode core body, a first active material mix layer disposed on one surface of the first electrode core body, and a second active material mix layer disposed on the other surface of the first electrode core body, a first separator is bonded to the first active material mix layer, a second separator is bonded to the second active material mix layer, and in at least one side edge portion of the first electrode plate, the first separator has a first bent portion that is bent toward the second separator, the first electrode core body has a second bent portion that is bent toward the second separator, and the second active material mix layer includes a region having a thickness less than the thickness of the second active material mix layer on the central portion of the first electrode plate.

When such a configuration is adopted, a secondary battery with high reliability is produced, where slide down of an end portion of each of the first active material mix layer and the second active material mix layer in the first electrode plate is suppressed.

According to the present invention, a secondary battery with high reliability is provided.

DETAILED DESCRIPTION OF THE INVENTION

The embodiment according to the present invention will be described below in detail. In this regard, the present invention is not limited to the following embodiment.

Figure 1:
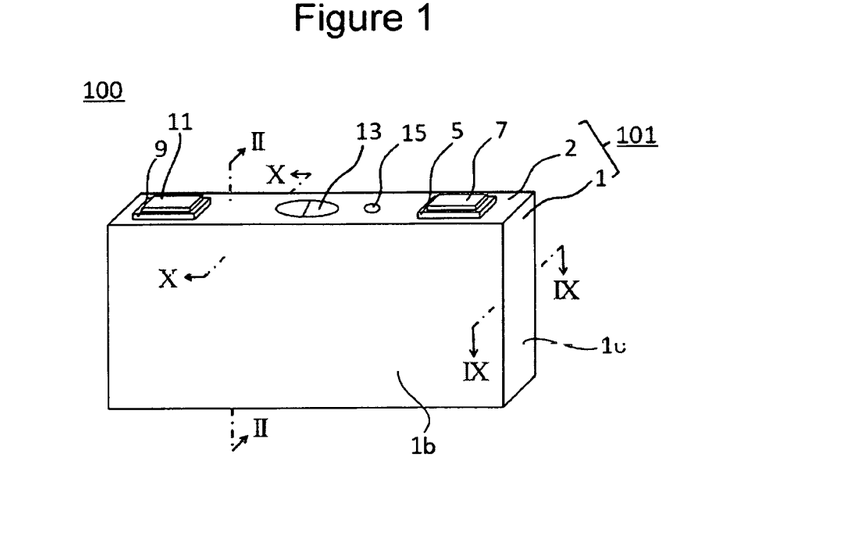
FIG. 1 is a perspective view of a square secondary battery according to an embodiment.
Figure 2:
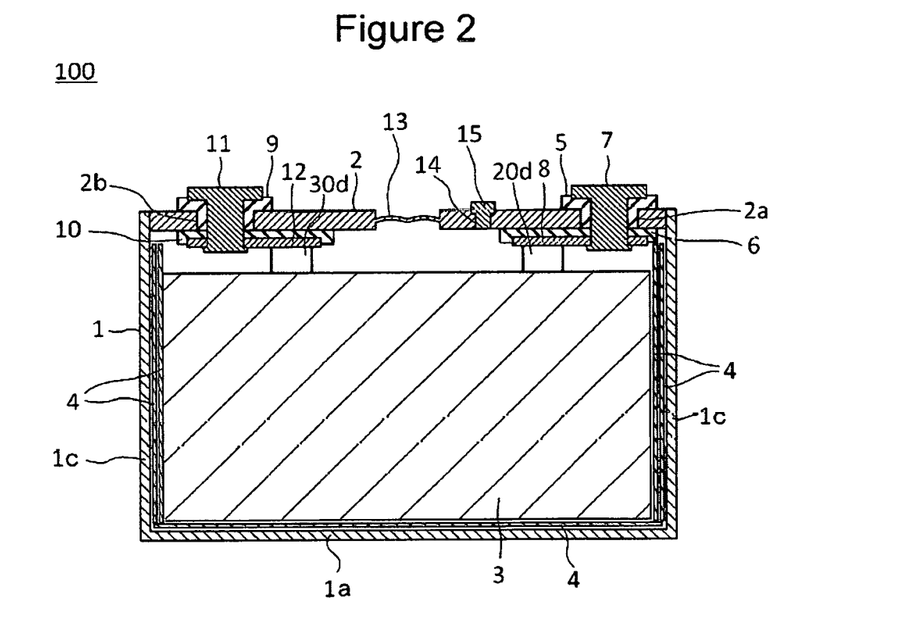
FIG. 2 is a sectional view of the square secondary battery along line II-II in FIG. 1.

The structure of a square secondary battery 100 according to an embodiment will be described with reference to FIG. 1 and FIG. 2. FIG. 1 is a perspective view of the square secondary battery 100 according to the embodiment. FIG. 2 is a sectional view of the square secondary battery 100. A battery case 101 is composed of a square outer jacket member 1 having a tubular shape with an opening and a bottom and a sealing plate 2 that seals the opening of the square outer jacket member 1. The square outer jacket member 1 has a bottom portion 1a, a pair of first side surfaces 1b, and a pair of second side surfaces 1c. The area of the first side surface 1b is more than the area of the second side wall 1c. An electrode assembly 3 including a positive electrode plate and a negative electrode plate is arranged in the square outer jacket member 1. An insulating sheet 4 is arranged between the square outer jacket member 1 and the electrode assembly 3 so as to insulate the square outer jacket member 1 from the electrode assembly 3. A positive electrode terminal 7 and a positive electrode collector 8 are attached to the sealing plate 2 with an outer insulating member 5 and an inner insulating member 6, respectively, interposed therebetween. Also, a negative electrode terminal 11 and a negative electrode collector 12 are attached to the sealing plate 2 with an outer insulating member 9 and an inner insulating member 10, respectively, interposed therebetween. A positive electrode tub portion 20d of the positive electrode plate is connected to the positive electrode collector 8. A negative electrode tub portion 30d of the negative electrode plate is connected to the negative electrode collector 12. A gas discharge valve 13 that raptures when the pressure in the battery case 101 becomes a predetermined value or more so as to discharge a gas in the battery case 101 to outside he battery case 101 is disposed in the sealing plate 2. The sealing plate 2 has an electrolytic solution injection hole 14, and the electrolytic solution injection hole 14 is sealed by a sealing plug 15.

Next, a method for producing the square secondary battery 100 according to the embodiment will be described.

Method for Producing Positive Electrode Plate

A positive electrode mix slurry is produced by mixing a lithium transition metal electrode compound oxide denoted by $LiNi_{0.35}Co_{0.35}Mn_{0.30}O_2$ serving as a positive electrode active material, carbon black serving as a conductive agent, and polyvinylidene fluoride serving as a binder with N-methyl-2-pyrrolidone serving as a dispersion medium. The mass ratio of the positive electrode active material to the conductive agent to the binder that are contained in the positive electrode mix slurry is set to be, for example, 91:7:2. Subsequently, the positive electrode mix slurry is applied by a die coater to each surface of an elongated extent of aluminum foil serving as a positive electrode core body 20a. Thereafter, the positive electrode mix slurry was dried so as to remove N-methyl-2-pyrrolidone serving as the dispersion medium. In this manner, a positive electrode original plate 200 in which a positive electrode active material mix layer 20b is disposed on each surface of the elongated extent of positive electrode core body 20a is produced.

Figure 3A:
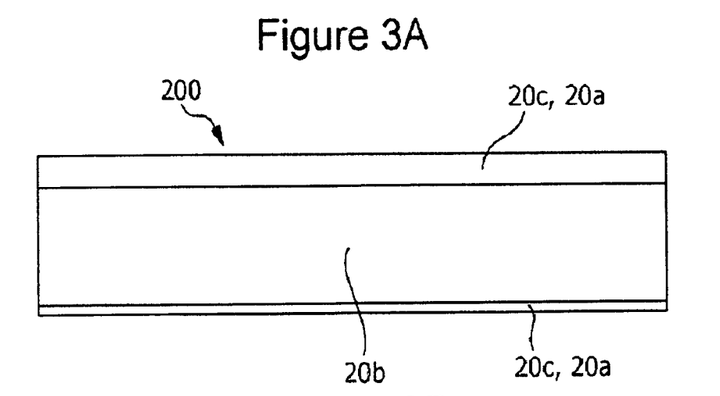
FIGS. 3A to 3C are diagrams illustrating a method for producing a positive electrode plate according to an embodiment.

FIG. 3A is a plan view of the positive electrode original plate 200 in which the positive electrode active material mix layer 20b is disposed on each surface of the elongated extent of positive electrode core body 20a. A positive electrode core body exposed potion 20c, which is provided with no positive electrode active material mix layer 20b and at which the positive electrode core body 20a is exposed, is disposed at both ends in the width direction of the positive electrode plate original plate 200.

Figure 3B:
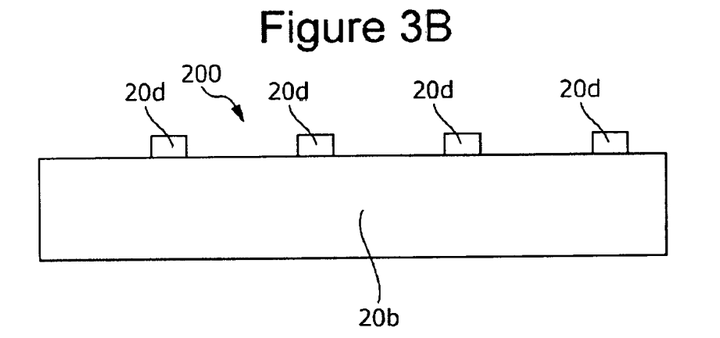

As shown in FIG. 3B, the positive electrode plate original plate 200 is cut such that positive electrode tub portions 20d composed of the positive electrode core body exposed potion 20c are formed at one end portion in the width direction of the positive electrode plate original plate 200. In this regard, as shown in FIG. 3B, a plurality of positive electrode tub portions 20d are formed at one end portion in the width direction of the positive electrode plate original plate 200 at predetermined intervals in the longitudinal direction of the positive electrode plate original plate 200. The positive electrode plate original plate 200 is cut such that the positive electrode core body exposed potion 20c not serving as positive electrode tub portions 20d is not left.

The positive electrode plate original plate 200 cut so as to be provided with the positive electrode tub portions 20d is passed between a pair of compression rollers (not shown in the drawing) and, thereby, the positive electrode active material mix layer 20b is compressed so as to have a predetermined density.

Figure 3C:
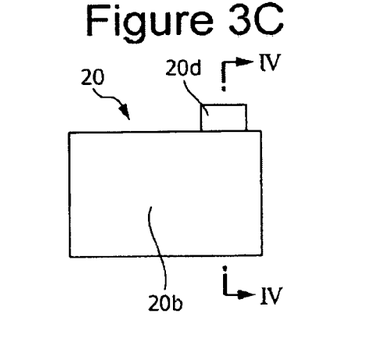

The positive electrode plate original plate 200 subjected to compression treatment of the positive electrode active material mix layer 20b is cut into a predetermined shape so as to produce a positive electrode plate 20 shown in FIG. 3C.

Figure 4:
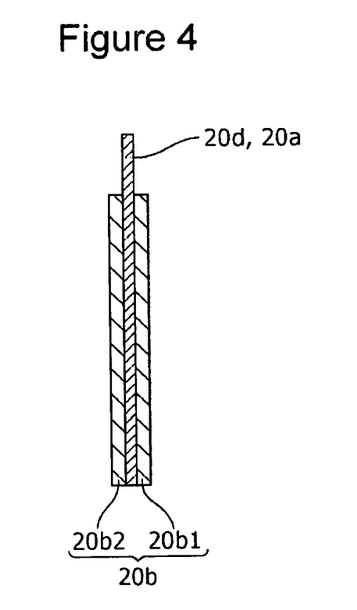
FIG. 4 is a sectional view of a positive electrode plate along line IV-IV in FIG. 3C.

FIG. 4 is a sectional view of the positive electrode plate 20 along line IV-IV in FIG. 3C. In the positive electrode plate 20, a first positive electrode active material mix layer 20b1 is disposed on one surface of the positive electrode core body 20a, and a second positive electrode active material mix layer 20b2 is disposed on the other surface. In addition, the positive electrode tub portion 20d composed of the positive electrode core body 20a is disposed at a side end of the positive electrode plate 20.

Method for Producing Negative Electrode Plate

A negative electrode mix slurry is produced by mixing graphite serving as a negative electrode active material, carboxymethyl cellulose serving as a thickener, and styrene-butadiene rubber serving as a binder with water serving as a dispersion medium. The mass ratio of the negative electrode active material to the thickener to the binder that are contained in the negative electrode mix slurry is set to be, for example, 98:1:1. Subsequently, the negative electrode mix slurry is applied by a die coater to each surface of an elongated extent of copper foil serving as a negative electrode core body 30a. Thereafter, the negative electrode mix slurry was dried so as to remove water serving as the dispersion medium. In this manner, a negative electrode original plate 300 in which a negative electrode active material mix layer 30b is disposed on each surface of the elongated extent of negative electrode core body 30a is produced.

Figure 5A:
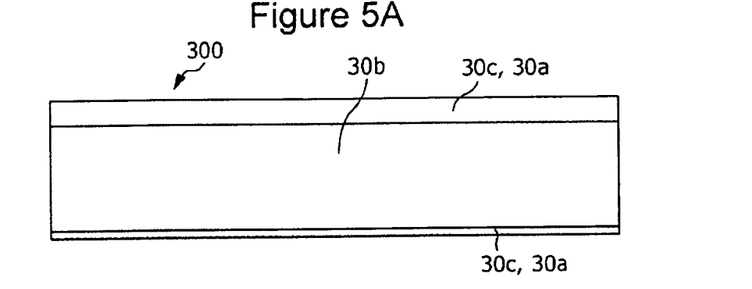
FIGS. 5A to 5D are diagrams illustrating a method for producing a multilayer body composed of a negative electrode plate and a separator according to an embodiment.

FIG. 5A is a plan view of the negative electrode original plate 300 in which the negative electrode active material mix layer 30b is disposed on each surface of the elongated extent of negative electrode core body 30a. A negative electrode core body exposed potion 30c, which is provided with no negative electrode active material mix layer 30b and at which the negative electrode core body 30a is exposed, is disposed at both ends in the width direction of the negative electrode original plate 300.

Figure 5B:
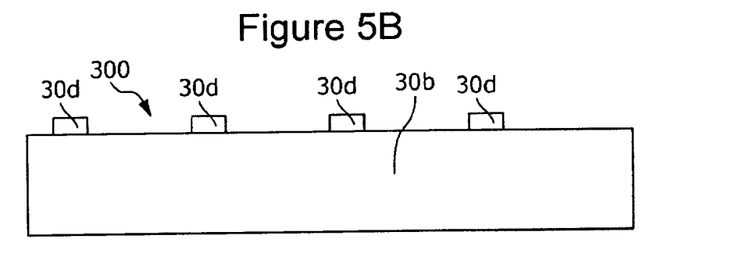

As shown in FIG. 5B, the negative electrode original plate 300 is cut such that negative electrode tub portions 30d composed of the negative electrode core body exposed potion 30c are formed at one end portion in the width direction of the negative electrode original plate 300. In this regard, as shown in FIG. 5B, a plurality of negative electrode tub portions 30d are formed at one end portion in the width direction of the negative electrode original plate 300 at predetermined intervals in the longitudinal direction of the negative electrode original plate 300. The negative electrode original plate 300 is cut such that the negative electrode core body exposed potion 30c not serving as negative electrode tub portions 30d is not left.

The negative electrode original plate 300 cut so as to be provided with the negative electrode tub portions 30d is passed between a pair of compression rollers (not shown in the drawing) and, thereby, the negative electrode active material mix layer 30b is compressed so as to have a predetermined density.

Figure 5C:
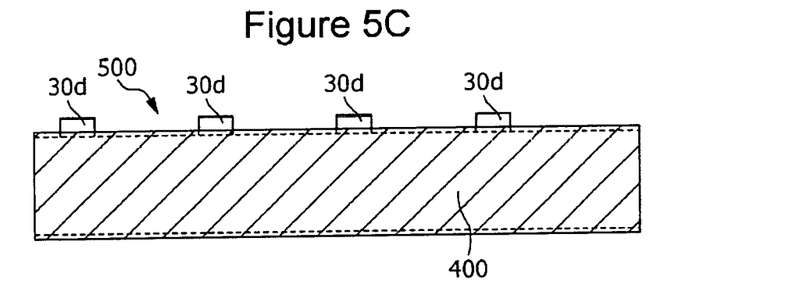

As shown in FIG. 5C, an elongated extent of separator original plate 400 is bonded to each surface of the negative electrode original plate 300 subjected to compression treatment of the negative electrode active material mix layer 30b. In this manner, a multilayer body original plate 500 composed of the negative electrode original plate 300 provided with the separator original plate 400 that is bonded to each surface is produced. The separator original plate 400 is bonded to the negative electrode active material mix layer 30b. There is no particular limitation regarding the bonding method. For example, an adhesive layer is formed on the surface of the separator original plate 400 in advance, and bonding may be performed by using the adhesive layer. Regarding the adhesive layer, for example, a material that bonds the separator original plate 400 to the negative electrode original plate 300 by being applied and dried or a material that bonds the separator original plate 400 to the negative electrode original plate 300 by being heated so as to soften or melt and, thereafter, cured may be used.

Figure 5D:
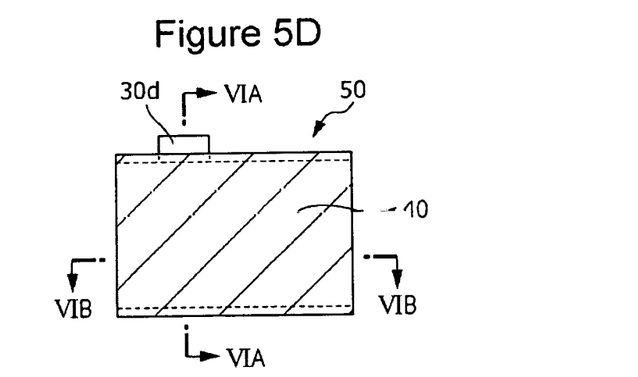

The multilayer body original plate 500 is cut into a predetermined shape so as to produce a multilayer body 50 shown in FIG. 5D.

Figure 6A:
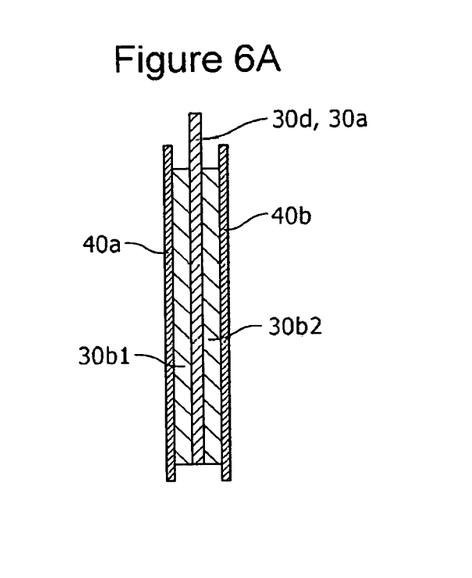
FIG. 6A is a sectional view of the multilayer body along line VIA-VIA in FIG. 5D.
Figure 6B:
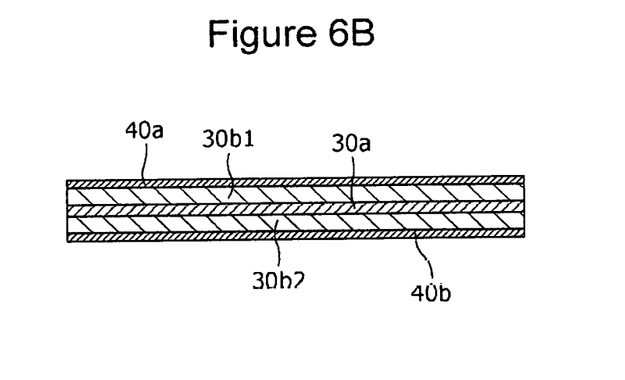
FIG. 6B is a sectional view of the multilayer body along line VIB-VIB in FIG. 5D.

FIG. 6A is a sectional view of the multilayer body 50 along line VIA-VIA in FIG. 5D. FIG. 6B is a sectional view of the multilayer body 50 along line VIB-VIB in FIG. 5D. In the negative electrode plate 30, a first negative electrode active material mix layer 30b1 is disposed on one surface of the negative electrode core body 30a. A first separator 40a is bonded to the first negative electrode active material mix layer 30b1. In the negative electrode plate 30, a second negative electrode active material mix layer 30b2 is disposed on the other surface. A second separator 40b is bonded to the second negative electrode active material mix layer 30b2.

As shown in FIG. 6A, the negative electrode tub portion 30d composed of the negative electrode core body 30a is disposed at a side end of the negative electrode plate 30. In the protrusion direction of the negative electrode tub portion 30d (vertical direction in FIG. 6A), the end portion of each of the first separator 40a and the second separator 40b protrudes outside the end portion of each of the first negative electrode active material mix layer 30b1 and the second negative electrode active material mix layer 30b2 (upward in FIG. 6A).

As shown in FIG. 6B, in the direction perpendicular to the protrusion direction of the negative electrode tub portion 30d (horizontal direction in FIG. 6B), the end portion of each of the first separator 40a and the second separator 40b locates at substantially the same position as the end portion of each of the first negative electrode active material mix layer 30b1 and the second negative electrode active material mix layer 30b2.

Production of Electrode Assembly

A layered electrode assembly 3 is produced by stacking alternately the positive electrode plate 20 and the multilayer body 50 composed of the separators 40 and the negative electrode plate 30, which are produced as described above. In the layered electrode assembly 3, it is preferable that the multilayer body 50 be arranged at each outer surface side in the stacking direction. As shown in FIG. 2, the positive electrode tub portions 20d stacked and the negative electrode tub portions 30d stacked are arranged at an end portion of the electrode assembly 3. In this regard, it is preferable that the positive electrode tub portions 20d and the negative electrode tub portions 30d be arranged on the sealing plate 2 side. When such a configuration is adopted, a square secondary battery having higher volume energy density is produced.

Attachment of Each Component to Sealing Plate

The sealing plate 2 has a positive electrode terminal attachment hole 2a and a negative electrode terminal attachment hole 2b. Regarding the sealing plate 2, the outer insulating member 5 is arranged on the battery outer surface side in the vicinity of the positive electrode terminal attachment hole 2a, and the inner insulating member 6 and the positive electrode collector 8 are arranged on the battery inner surface side in the vicinity of the positive electrode terminal attachment hole 2a. The positive electrode terminal 7 is inserted from the battery outside into a through hole in the outer insulating member 5, the positive electrode terminal attachment hole 2a, a through hole in the inner insulating member 6, and a through hole in the positive electrode collector 8, and the end of the positive electrode terminal 7 is swaged onto the positive electrode collector 8. Then, a swaged portion of the positive electrode terminal 7 is welded to the positive electrode collector 8. Consequently, the positive electrode terminal 7 and the positive electrode collector 8 are attached to the sealing plate 2. Regarding the sealing plate 2, the outer insulating member 9 is arranged on the battery outer surface side in the vicinity of the negative electrode terminal attachment hole 2b, and the inner insulating member 10 and the negative electrode collector 12 are arranged on the battery inner surface side in the vicinity of the negative electrode terminal attachment hole 2b. The negative electrode terminal 11 is inserted from the battery outside into a through hole in the outer insulating member 9, the negative electrode terminal attachment hole 2b, a through hole in the inner insulating member 10, and a through hole in the negative electrode collector 12, and the end of the negative electrode terminal 11 is swaged onto the negative electrode collector 12. Then, a swaged portion of the negative electrode terminal 11 is welded to the negative electrode collector 12. Consequently, the negative electrode terminal 11 and the negative electrode collector 12 are attached to the sealing plate 2.

Connection between Collector and Tub Portion

The stacked positive electrode tub portions 20d of the electrode assembly 3 are welded to the positive electrode collector 8 attached to the sealing plate 2. In addition, the stacked negative electrode tub portions 30d of the electrode assembly 3 are welded to the negative electrode collector 12 attached to the sealing plate 2.

Assembly of Square Secondary Battery

The electrode assembly 3 is covered with a resin insulating sheet 4, and inserted into the square outer jacket member 1. The sealing plate 2 is welded to the square outer jacket member 1 so as to seal the opening of the square outer jacket member 1 by the sealing plate 2. Thereafter, a nonaqueous electrolytic solution is injected through an electrolytic solution injection hole 14 located in the seal plate 2, and the electrolytic solution injection hole 14 is sealed by the sealing plug 15. In this manner, the square secondary battery 100 is produced.

Method for Cutting Multilayer Body Original Plate

Next, a method for cutting the multilayer body original plate 500 composed of the negative electrode original plate 300 and the separator original plate 400 will be described.

Figure 7:
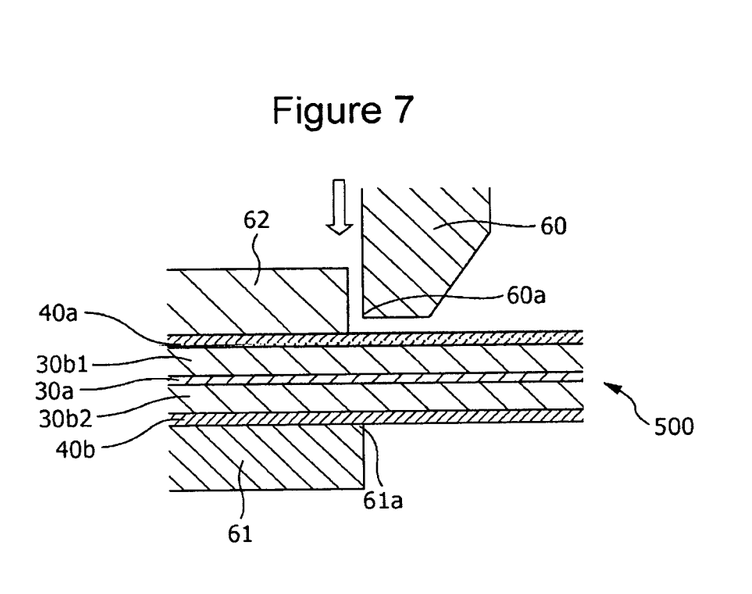
FIG. 7 is a diagram illustrating a method for cutting a multilayer body original plate.

FIG. 7 is a diagram illustrating a method for cutting the multilayer body original plate 500. As shown in FIG. 7, the multilayer body original plate 500 is arranged on a lower jig 61. The upper surface of the multilayer body original plate 500 is pressed by a pressure jig 62. Consequently, the multilayer body original plate 500 is held between the lower jig 61 and the pressure jig 62. In this regard, regarding the lower jig 61, the corner facing the multilayer body original plate 500 is a lower cutting edge 61a.

Regarding an upper jig 60 arranged above the multilayer body original plate 500, a corner that is located on the pressure jig 62 side and that faces the multilayer body original plate 500 is an upper cutting edge 60a. The upper jig 60 is moved downward so as to cut the multilayer body original plate 500 held between the lower jig 61 and the pressure jig 62 by the upper cutting edge 60a and the lower cutting edge 61a. Regarding a cross section of the upper cutting edge 60a (cross section shown in FIG. 7) in a direction perpendicular to the direction parallel to the cut surface of the multilayer body original plate 500 (horizontal direction in FIG. 7), the angle of the upper cutting edge 60*a* may be 90 degrees or an obtuse angle. However, the angle may be an acute angle. It is preferable that the lower jig 61 protrude toward the upper jig 60 side in a direction perpendicular to the direction parallel to the cut surface of the multilayer body original plate 500 (horizontal direction in FIG. 7) when compared with the pressure jig 62. It is preferable that the lower cutting edge 61*a* and the upper cutting edge 60*a* be arranged at substantially the same position in a direction perpendicular to the direction parallel to the cut surface of the multilayer body original plate 500 (horizontal direction in FIG. 7).

Shape of End Portion of Multilayer Body 50

Figure 8:
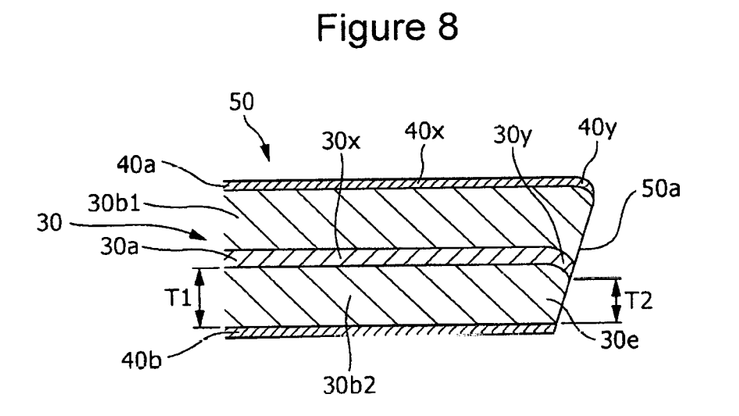
FIG. 8 is a magnified sectional view of a cut end portion of a multilayer body.

FIG. 8 is a diagram showing the shape of a cut end portion of the multilayer body 50. In this regard, FIG. 8 is a sectional view of the multilayer body 50 in a direction perpendicular to the direction parallel to the cut surface of the multilayer body original plate 500 (horizontal direction in FIG. 7). The negative electrode plate 30 corresponds to a first electrode plate. The negative electrode core body 30*a*, the first negative electrode active material mix layer 30*b*1, and the second negative electrode active material mix layer 30*b*2 correspond to a first electrode core body, a first active material mix layer, and a second active material mix layer, respectively. The negative electrode tub portion 30*d* corresponds to a first electrode tub portion, and the positive electrode tub portion 20*d* corresponds to a second electrode tub portion.

As shown in FIG. 8, the first separator 40*a* has a first flat portion 40*x* in the central portion and has a first bent portion 40*y* serving as the end portion that is bent toward the second separator 40*b* (downward in FIG. 8). The negative electrode core body 30*a* has a second flat portion 30*x* in the central portion and has a second bent portion 30*y* serving as the end portion that is bent toward the second separator 40*b* (downward in FIG. 8). The second negative electrode active material mix layer 30*b*2 arranged between the negative electrode core body 30*a* and the second separator 40*b* has a region 30*e* serving as the end portion and having a thickness less than the thickness of the central portion. When such a configuration is adopted, a secondary battery with high reliability is produced, where slide down of each of the first negative electrode active material mix layer 30*b*1 and the second negative electrode active material mix layer 30*b*2 is suppressed. In FIG. 8, the thickness of the second negative electrode active material mix layer 30*b*2 on the central portion of the negative electrode plate 30 is T1, and the thickness of the second negative electrode active material mix layer 30*b*2 at the end portion is T2. It is preferable that no bent portion be formed as the end portion of the second separator. Even when a bent portion is formed at the end portion of the second separator, it is preferable that the degree of bending of the bent portion be less than the degree of bending of each of the first bent portion 40*y* and the second bent portion 30*y*. In this regard, the degree of bending refers to the distance between the lower surface of a flat portion and the end of the bent portion in the thickness direction of the multilayer body 50.

As shown in FIG. 8, the multilayer body end surface 50*a* of the multilayer body 50 has a shape inclined relative to the thickness direction of the multilayer body 50. The end portion of the first separator 40*a* protrudes outside the end portion of the negative electrode core body 30*a*.

Figure 9:
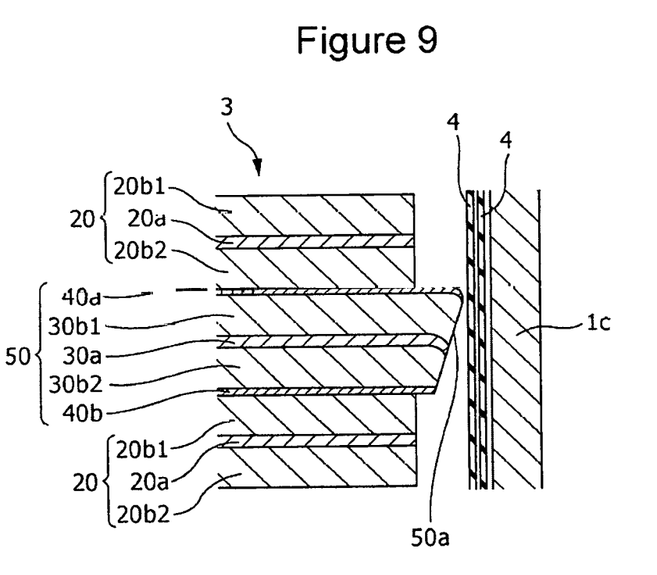
FIG. 9 is a partial sectional view along a line IX-IX shown in FIG. 1.

FIG. 9 is a partial sectional view of the electrode assembly 3, the insulating sheet 4, and a second side wall 1*c* of the square outer jacket member 1 in the vicinity of the end portion of the electrode assembly 3 along a line IX-IX shown in FIG. 1. The resin insulating sheet 4 is arranged between the electrode assembly 3 and the square outer jacket member 1. At the end portion of the electrode assembly 3, the end portion of the multilayer body 50 is located at the position nearer than the end portion of the positive electrode plate 20 to the square outer jacket member 1. In the multilayer body 50, the first separator 40*a* and the first negative electrode active material mix layer 30*b*1 are located at positions nearer than the end portion of the negative electrode core body 30*a* to the square outer jacket member 1. Consequently, the negative electrode core body 30*a* can be reliably prevented from damaging or breaking the insulating sheet 4, and the negative electrode core body 30*a* can be reliably prevented from coming into contact with the square outer jacket member 1. In addition, the second bent portion 30*y* is formed as the end portion of the negative electrode core body 30*a*. Therefore, the negative electrode core body 30*a* can be more reliably prevented from damaging or breaking the insulating sheet 4, and the negative electrode core body 30*a* can be more reliably prevented from coming into contact with the square outer jacket member 1. In this regard, it is preferable that the insulating sheet 4 be arranged double between the surface at which the first bent portion 40*y* and the second bent portion 30*y* of the multilayer body 50 are located in the electrode assembly 3 and the square outer jacket member 1. As a result, the negative electrode plate 30 can be reliably prevented from being electrical connected to the square outer jacket member 1.

As shown in FIG. 9, the multilayer body end surface 50*a* is inclined relative to the inner surface of the square outer jacket member 1. Consequently, the contact area between the negative electrode active material mix layer 30*b* and the insulating sheet 4 can be decreased. Therefore, damage to the negative electrode active material mix layer 30*b* due to contact between the negative electrode active material mix layer 30*b* and the insulating sheet 4 can be reduced. In addition, when a nonaqueous electrolytic solution is injected through the electrolytic solution injection hole 14 located in the sealing plate 2 into the square outer jacket member 1, the electrolytic solution readily enters between the multilayer body end surface 50*a* and the insulating sheet 4 and, therefore, an efficiency of injection of the electrolytic solution into the negative electrode active material mix layer 30*b* is improved.

Figure 10:
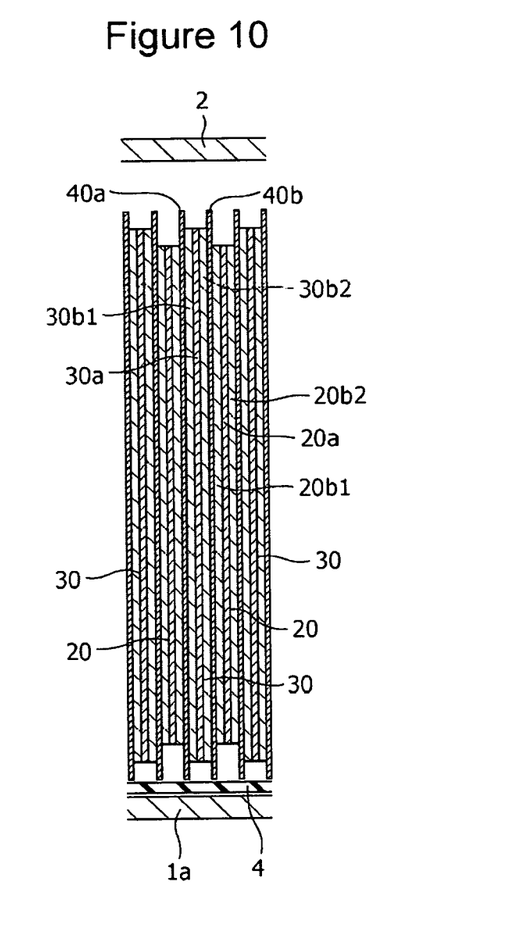
FIG. 10 is a partial sectional view along a line X-X shown in FIG. 1.

FIG. 10 is a partial sectional view of the square secondary battery 100 along a line X-X shown in FIG. 1. At the sealing plate 2 side end portion of the electrode assembly 3, the first separator 40*a* and the second separator 40*b* protrude toward the sealing plate 2 when compared with the first negative electrode active material mix layer 30*b*1 and the second negative electrode active material mix layer 30*b*2 of the negative electrode plate 30. At the bottom portion 1*a* side end portion of the electrode assembly 3, the first separator 40*a* and the second separator 40*b* protrude toward the bottom portion 1*a* when compared with the first negative electrode active material mix layer 30*b*1 and the second negative electrode active material mix layer 30*b*2 of the negative electrode plate 30. When such a configuration is adopted, the first negative electrode active material mix layer 30*b*1 and the second negative electrode active material mix layer 30*b*2 can be prevented from being damaged because contact of the first negative electrode active material mix layer 30*b*1 and the second negative electrode active material mix layer 30*b*2 with the insulating sheet 4 can be prevented. The effect is enhanced when the positive electrode plate 20 is bonded to the separator 40 and the separator 40 is bonded to the negative electrode plate 30.

Modified Example 1

Figure 11:
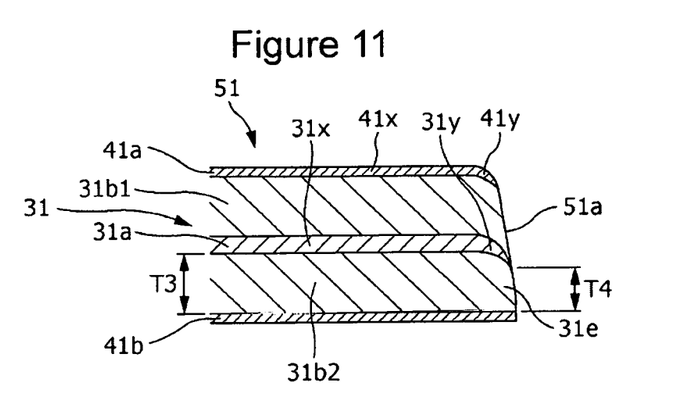
FIG. 11 is a magnified sectional view of a cut end portion of a multilayer body according to modified example 1.

FIG. 11 is a diagram showing the shape of a cut end portion of a multilayer body 51 according to modified example 1. FIG. 11 is a sectional view of the multilayer body 51 in a direction perpendicular to the direction parallel to the cut surface of the multilayer body original plate. The multilayer body 51 includes a negative electrode plate 31, a first separator 41a, and a second separator 41b. In the multilayer body 51, a first negative electrode active material mix layer 31b1 is disposed on one surface of the negative electrode core body 31a. A first separator 41a is bonded to the first negative electrode active material mix layer 31b1. A second negative electrode active material mix layer 31b2 is disposed on the other surface of the negative electrode core body 31a. A second separator 41b is bonded to the second negative electrode active material mix layer 31b2. The first separator 41a has a first flat portion 41x in the central portion and has a first bent portion 41y serving as the end portion that is bent toward the second separator 41b. The negative electrode core body 31a has a second flat portion 31x in the central portion and has a second bent portion 31y serving as the end portion that is bent toward the second separator 41b. The second negative electrode active material mix layer 31b2 arranged between the negative electrode core body 31a and the second separator 41b has a region 31e serving as the end portion and having a thickness less than the thickness of the central portion. In FIG. 11, the thickness of the second negative electrode active material mix layer 31b2 on the central portion of the negative electrode plate 31 is T3, and the thickness of the second negative electrode active material mix layer 31b2 at the end portion is T4.

In the multilayer body 51 according to modified example 1, the end portion of the second separator 41b and the end portion of the second negative electrode active material mix layer 31b2 protrudes outside the end portion of the negative electrode core body 31a (to the right in FIG. 11). Consequently, the negative electrode core body 31a can be reliably prevented from damaging the insulating sheet 4 arranged between the multilayer body 3 and the square outer jacket member 1. Therefore, electrical connection between the negative electrode plate 31 and the square outer jacket member 1 can be reliably prevented.

In the multilayer body 51 according to modified example 1, the second bent portion 31y is formed as the end portion of the negative electrode core body 31a. Therefore, the negative electrode core body 31a can be more effectively prevented from damaging or breaking the insulating sheet 4, and the negative electrode core body 31a can be more effectively prevented from coming into contact with the square outer jacket member 1.

As shown in FIG. 11, the multilayer body end surface 51a of the multilayer body 51 has a shape inclined relative to the thickness direction of the multilayer body 51. Consequently, the multi layer body end surface 51a of the multilayer body 51 is inclined relative to the inner surface of the square outer jacket member 1. As a result, the contact areas between the negative electrode active material mix layer 31b1 and the insulating sheet 4 and between the second negative electrode active material mix layer 31b2 and the insulating sheet 4 can be decreased. Therefore, damage to the negative electrode active material mix layer 31b due to contact between the negative electrode active material mix layer 31b1 and the insulating sheet 4 and between the second negative electrode active material mix layer 31b2 and the insulating sheet 4 can be reduced. In addition, when a nonaqueous electrolytic solution is injected through the electrolytic solution injection hole 14 located in the sealing plate 2 into the square outer jacket member 1, the electrolytic solution readily enters between the multilayer body end surface 51a and the insulating sheet 4 and, therefore, an efficiency of injection of the electrolytic solution into the negative electrode active material mix layer 31b1 and the second negative electrode active material mix layer 31b2 is improved.

Modified Example 2

Figure 12:
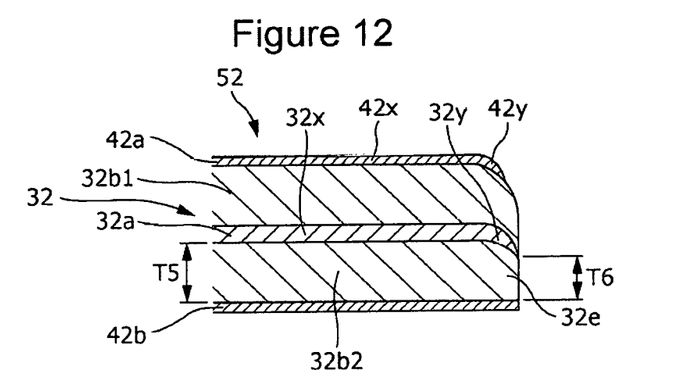
FIG. 12 is a magnified sectional view of a cut end portion of a multilayer body according to modified example 2.

FIG. 12 is a diagram showing the shape of a cut end portion of a multilayer body 52 according to modified example 2. FIG. 12 is a sectional view of the multilayer body 52 in a direction perpendicular to the direction parallel to the cut surface of the multilayer body original plate. The multilayer body 52 includes a negative electrode plate 32, a first separator 42a, and a second separator 42b. In the multilayer body 52, a first negative electrode active material mix layer 32b1 is disposed on one surface of the negative electrode core body 32a. A first separator 42a is bonded to the first negative electrode active material mix layer 32b1. A second negative electrode active material mix layer 32b2 is disposed on the other surface of the negative electrode core body 32a. A second separator 42b is bonded to the second negative electrode active material mix layer 32b2. The first separator 42a has a first flat portion 42x in the central portion and has a first bent portion 42y serving as the end portion that is bent toward the second separator 42b. The negative electrode core body 32a has a second flat portion 32x in the central portion and has a second bent portion 32y serving as the end portion that is bent toward the second separator 42b. The second negative electrode active material mix layer 32b2 arranged between the negative electrode core body 32a and the second separator 42b has a region 32e serving as the end portion and having a thickness less than the thickness of the central portion. In FIG. 12, the thickness of the second negative electrode active material mix layer 32b2 on the central portion of the negative electrode plate 32 is T5, and the thickness of the second negative electrode active material mix layer 32b2 at the end portion is T6.

In the multilayer body 52 according to modified example 2, the end portion of the first negative electrode active material mix layer 32b1 protrudes outside the end portion of the negative electrode core body 32a (to the right in FIG. 12). Consequently, the negative electrode core body 32a can be reliably prevented from damaging the insulating sheet 4 arranged between the multilayer body 3 and the square outer jacket member 1. Therefore, electrical connection between the negative electrode plate 32 and the square outer jacket member 1 can be reliably prevented.

In the multilayer body 52 according to modified example 2, the second bent portion 32y is formed as the end portion of the negative electrode core body 32a. Therefore, the negative electrode core body 32a can be more effectively prevented from damaging or breaking the insulating sheet 4, and the negative electrode core body 32a can be more effectively prevented from coming into contact with the square outer jacket member 1.

Modified Example 3

Figure 13:
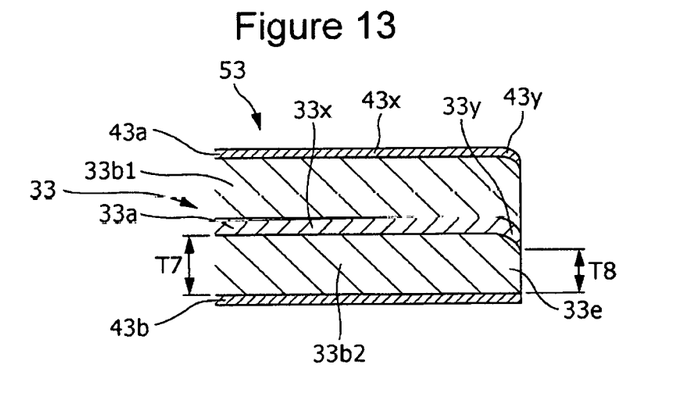
FIG. 13 is a magnified sectional view of a cut end portion of a multilayer body according to modified example 3.

FIG. 13 is a diagram showing the shape of a cut end portion of a multilayer body 53 according to modified example 3. FIG. 13 is a sectional view of the multilayer body 53 in a direction perpendicular to the direction parallel to the cut surface of the multilayer body original plate. The multilayer body 53 includes a negative electrode plate 33, a first separator 43a, and a second separator 43b. In the multilayer body 53, a first negative electrode active material mix layer 33b1 is disposed on one surface of the negative electrode core body 33a. A first separator 43a is bonded to the first negative electrode active material mix layer 33b1. A second negative electrode active material mix layer 33b2 is disposed on the other surface of the negative electrode core body 33a. A second separator 43b is bonded to the second negative electrode active material mix layer 33b2. The first separator 43a has a first flat portion 43x in the central portion and has a first bent portion 43y serving as the end portion that is bent toward the second separator 43b. The negative electrode core body 33a has a second flat portion 33x in the central portion and has a second bent portion 33y serving as the end portion that is bent toward the second separator 43b. The second negative electrode active material mix layer 33b2 arranged between the negative electrode core body 33a and the second separator 43b has a region 33e serving as the end portion and having a thickness less than the thickness of the central portion. In FIG. 13, the thickness of the second negative electrode active material mix layer 33b2 on the central portion of the negative electrode plate 33 is T7, and the thickness of the second negative electrode active material mix layer 33b2 at the end portion is T8.

In the multilayer body 53 according to modified example 3, the second bent portion 33y is formed as the end portion of the negative electrode core body 33a. Therefore, the negative electrode core body 33a can be more effectively prevented from damaging or breaking the insulating sheet 4, and the negative electrode core body 33a can be more effectively prevented from coming into contact with the square outer jacket member 1.

Others

In the above-described embodiment and modified examples, examples in which the first electrode plate is a negative electrode plate, and the second electrode plate is a positive electrode plate are shown. In this regard, the first electrode plate may be a positive electrode plate, and the second electrode plate may be a negative electrode plate. However, it is preferable that the first electrode plate be a negative electrode plate. It is preferable that the area in plan view of a negative electrode plate serving as the first electrode plate be more than the area in plan view of a positive electrode plate serving as the second electrode plate. Also, it is preferable that the area in plan view of the separator be more than the area in plan view of a negative electrode plate serving as the first electrode plate. As a result, an occurrence of a short circuit between the positive electrode plate and the negative electrode plate can be reliably prevented.

It is not necessary that all side edges of the first electrode plate have the configuration according to the present invention as long as at least one side edge has the configuration according to the present invention. For example, regarding the first electrode plate, when the shape in plan view of the portion excluding the tub portion is square, there are four side edges. The effect of the present invention is obtained when at least one side edge of the four side edges has the configuration according to the present invention.

In the form shown in the above-described embodiment, the insulating sheet 4 is arranged double between the multilayer body 3 and the second wall 1c of the square outer jacket member 1 but the form is not limited to this. The insulating sheet 4 arranged between the multilayer body 3 and the second wall 1c of the square outer jacket member 1 may be one sheet.

Known materials may be used for forming the positive electrode plate, the negative electrode plate, the separator, and the like.

The positive electrode core body constituting the positive electrode plate is preferably metal foil, and more preferably aluminum foil or aluminum alloy foil. The thickness of the positive electrode core body is preferably 3 µm to 50 µm, more preferably 5 µm to 30 µm, and further preferably 5 µm to 20 µm. The negative electrode core body constituting the negative electrode plate is preferably metal foil, and more preferably copper foil or copper alloy foil. The thickness of the negative electrode core body is preferably 3 µm to 50 µm, more preferably 5 µm to 30 µm, and further preferably 5 µm to 15 µm.

The positive electrode active material mix layer and the negative electrode active material mix layer contain at least an active material and a binder, and may contain a conductive agent, additives, and the like as the situation demands. The thickness of the positive electrode active material mix layer disposed on one surface of the positive electrode core body is preferably 10 µm to 300 µm, more preferably 10 µm to 200 µm, and further preferably 10 µm to 100 µm. The thickness of the negative electrode active material mix layer disposed on one surface of the negative electrode core body is preferably 10 µm to 300 µm, more preferably 10 µm to 200 µm, and further preferably 10 µM to 100 µm.

The separator is preferably a porous resin film. For example, a polyolefin porous film is preferable. The thickness of the separator is preferably 3 µm to 100 µm, more preferably 5 µm to 50 µm, and further preferably 5 µm to 30 µm.

The first electrode plate may be bonded to the separator by a known method. For example, when the first electrode plate is bonded to the separator by an adhesive, the adhesive is preferably made of a resin. For example, polyvinylidene fluoride (PVDF), carboxymethyl cellulose (CMC), polyvinyl alcohol (PVA), an acrylic adhesive, and a rubber-based adhesive may be used.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
    an electrode assembly including a first electrode plate and a second electrode plate; and
    a battery case that accommodates the electrode assembly,
    wherein the first electrode plate includes a first electrode core body, a first active material mix layer disposed on one surface of the first electrode core body, and a second active material mix layer disposed on the other surface of the first electrode core body,
    a first separator is bonded to the first active material mix layer,
    a second separator is bonded to the second active material mix layer, and
    in at least one side edge portion of the first electrode plate, the first separator has a first bent portion that is bent toward the second separator, the first electrode core body has a second bent portion that is bent toward the second separator, and the second active material mix layer includes a region having a thickness less than the thickness of the second active material mix layer on the central portion of the first electrode plate.

2. The secondary battery according to claim 1, wherein the electrode assembly is a layered electrode assembly including a plurality of the first electrode plates and a plurality of the second electrode plates, and the battery case is square.

3. The secondary battery according to claim 1, wherein the first electrode plate is a negative electrode plate, the second electrode plate is a positive electrode plate, the area of the first electrode plate in plan view is more than the area of the second electrode plate in plan view, and the area of the first separator in plan view and the area of the second separator in plan view are more than the area of the first electrode plate in plan view.

4. The secondary battery according to claim 1, wherein the battery case includes a square outer jacket member having an opening, a bottom portion, a pair of first side walls, and a pair of second side walls and a sealing plate that seals the opening, the area of the first side wall is more than the area of the second side wall, the first electrode plate has a first electrode tub portion at a sealing-plate-side end portion, the second electrode plate has a second electrode tub portion at the sealing-plate-side end portion, each of the first separator and the second separator protrudes from the sealing-plate-side end portion toward the sealing plate when compared with the first active material mix layer and the second active material mix layer, and each of the first separator and the second separator protrudes from the bottom-portion-side end portion toward the bottom portion when compared with the first active material mix layer and the second active material mix layer.

5. The secondary battery according to claim 4, wherein the electrode assembly is arranged in the square outer jacket member such that the side surface including the locations of the first bent portion and the second bent portion faces the second side wall with an insulating sheet interposed therebetween.

6. The secondary battery according to claim 5, wherein an insulating sheet is arranged double between the second wall and the side surface including the locations of the first bent portion and the second bent portion.

* * * * *